United States Patent [19]

Hironaka et al.

[11] Patent Number: 4,932,364
[45] Date of Patent: Jun. 12, 1990

[54] INTERNAL COMBUSTION ENGINE

[75] Inventors: Yoshiaki Hironaka, Sayama; Yoshikiyo Kamata, Hachioji; Yukio Sakaguchi, Kanagawa, all of Japan

[73] Assignee: Kioritz Corporation, Tokyo, Japan

[21] Appl. No.: 412,678

[22] Filed: Sep. 26, 1989

[30] Foreign Application Priority Data

Oct. 5, 1988 [JP] Japan .................. 63-130714[U]

[51] Int. Cl.$^5$ .............................. F02B 63/00
[52] U.S. Cl. ........................... 123/2; 123/65 R
[58] Field of Search .......... 123/2, 3, 65 R, 311, 123/599, 185 A, 195 R, 195 A

[56] References Cited

U.S. PATENT DOCUMENTS

| 4,142,502 | 3/1979 | Nakano et al. | 123/195 A |
|---|---|---|---|
| 4,494,490 | 1/1985 | Kiyooka et al. | 123/198 E |
| 4,653,762 | 3/1987 | Nakamura et al. | 123/495 |
| 4,813,385 | 3/1989 | Yamaguchi et al. | 123/2 |
| 4,856,470 | 8/1989 | Ishii et al. | 123/195 C |

FOREIGN PATENT DOCUMENTS 54-36166 1/1979 Japan .
63-19552 1/1988 Japan .

Primary Examiner—David A. Okonsky
Attorney, Agent, or Firm—Bauer & Schaffer

[57] ABSTRACT

An internal combustion engine provided with an air cleaner and a muffler respectively on both sides of the crankshaft of the engine body and with a fuel tank below them wherein the air cleaner and the muffler are formed to be vertically extended respectively at the lower ends thereof along both sides of the engine body, the fuel tank is formed to be substantially like T made integrally of a barrel part and a head part inflated out on both sides in front of the barrel part, the barrel part is fitted in a space made by the air cleaner and the muffler below the engine body and both side parts of the head are arranged respectively in front of the lower parts of the air cleaner and the muffler.

1 Claim, 4 Drawing Sheets

INTERNAL COMBUSTION ENGINE

FIELD OF THE INVENTION

This invention relates to an internal combustion engine to be used for such various working machines as grass trimmers.

BACKGROUND OF THE INVENTION

An air-cooled two-cycle internal combustion engine, for example, is generally provided with an air cleaner and a muffler respectively on both sides of the crankssshaft of the engine and with a fuel tank below them.

Conventionally, in this kind of internal combustion engine, in order to reduce the size and weight of the engine body, the above mentioned air cleaner and muffler have been formed to be of necessary minimum sizes not projecting below the lower surface of the above mentioned engine body and the fuel tank formed to be of a merely substantially rectangular parallelepiped has been provided below and over all of the above mentioned air cleaner, engine body and muffler so that the fuel may be sufficiently carried.

As mentioned above, in the conventional internal combustion engine, as the air cleaner and the muffler have been limited at the lower ends thereof by the fuel tank, the capacities of the air cleaner and the muffler have not been able to help to be made small. Therefore, there have been defects that the suction and exhaust sounds have not been able to be well reduced and that the output has not been able to be improved.

BRIEF SUMMARY OF THE INVENTION

This invention has been made to provide an internal combustion engine which can reduce the noise and improve the output and is compact in size and neat to handle.

For this purpose, according to the present invention, in an internal combustion engine provided with an air cleaner and muffler respectively on both sides of the crankshaft of the engine and with a fuel tank below them, the air cleaner and the muffler are vertically extended at the lower ends respectively along both sides of the engine body, the fuel tank is formed to be substantially like T made integrally of a barrel part and a head part inflated out on both sides in front of the barrel part, the barrel part is fitted in a space made by the air cleaner and the muffler below the engine body and both side parts of the head part are arranged respectively in front of the lower parts of the air cleaner and the muffler.

According to the present invention, as the air cleaner and the muffler are formed to be vertically extended at the lower ends thereof along both sides of the engine body, their volumes will be larger by the extensions than the volumes of the air cleaner and the muffler in conventional internal combustion engine and, as a result, there are advantages that the noise can be reduced and the output can be improved. Further, in the present invention, as the fuel tank is formed to be substantially like T, there are advantages that the remaining space avoiding the downward extended parts of the air cleaner and the muffler can be effectively utilized as a space for the fuel tank and the engine can be made compact and neat as a whole while securing the tank volume.

DETAILED DESCRIPTION OF THE PREFERRED EMBODIMENT

Figure 1:
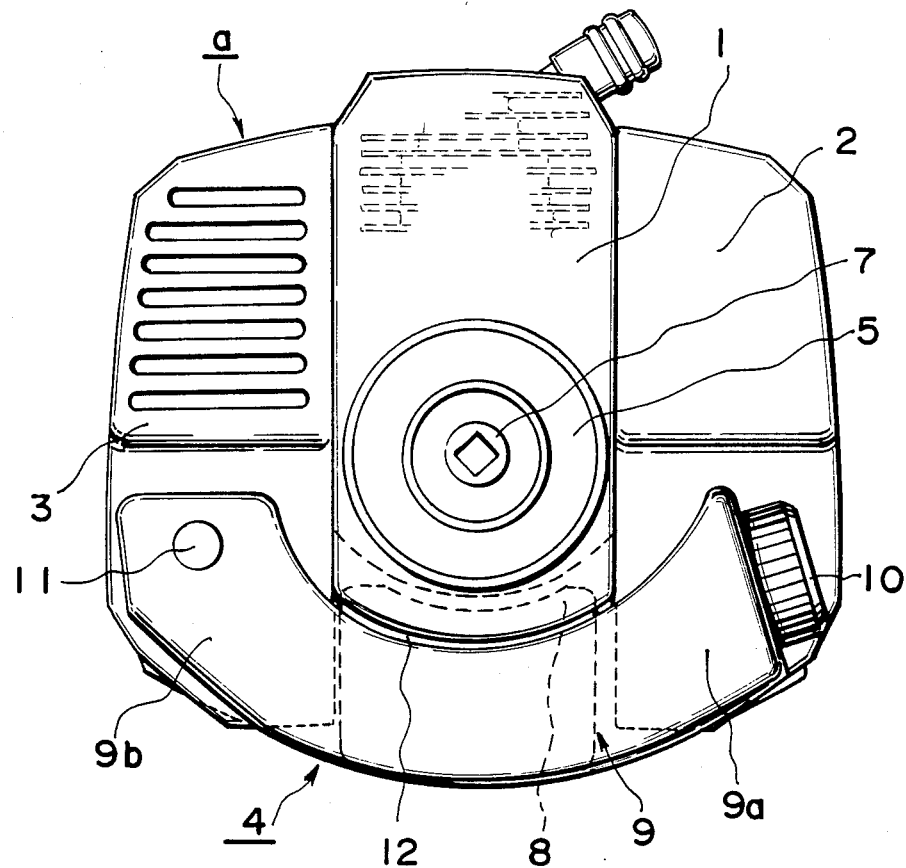
FIG. 1 is an elevation of an internal combustion engine embodying the present invention.

The present invention shall be described in detail in the following with reference to the embodiment shown in the drawings.

In the drawings, the reference numeral 1 represents an engine body of an air cooled two-cycle internal combustion engine for a grass trimmer, 2 represents an air cleaner, 3 represents a muffler and 4 represents a fuel tank. The internal combustion engine (a) of the present invention is provided with the air cleaner 2 and the muffler 3 respectively of sizes necessary and sufficient to improve output and reduce the noise on both sides of the crankshaft of the engine body 1 (in the right and left direction as seen in FIG. 1) and with the fuel tank 4 below them.

By the way, though not shown in detail in the drawings, the engine body 1 comprises a cylinder, piston, connecating rod, crankshaft and crankcase. In the case of the embodiment shown in the drawings, in the engine body 1, a recoil starter connected to the crankshaft at the rear end and a centrifugal clutch connected to the above mentioned crankshaft at the front end are built-in, further a connecting part 5 is provided to project in the axial direction of the crankshaft in the centrifugal clutch side part (forward part), a tubular operating rod 6 is made connectable to the connecting part 5 and a transmission shaft (not illustrated) provided within the operating rod 6 is made connectable to an output shaft 7 of the centrifugal clutch.

Figure 2:
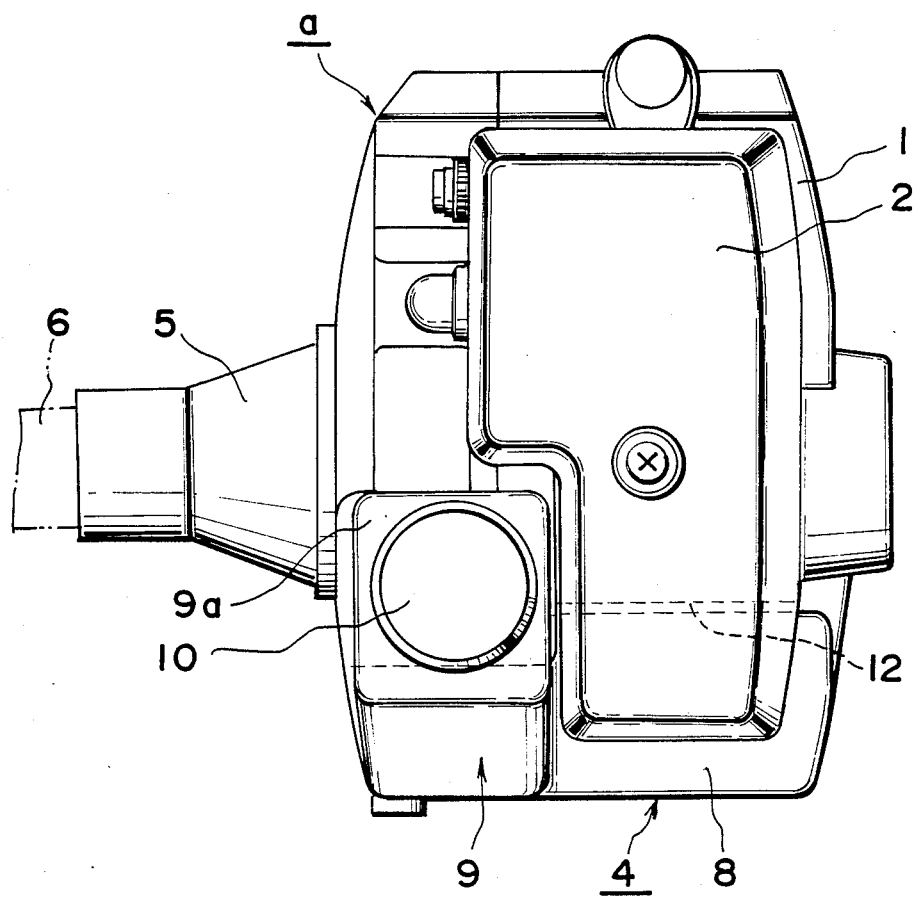
FIG. 2 is a right side view of FIG. 1.
Figure 3:
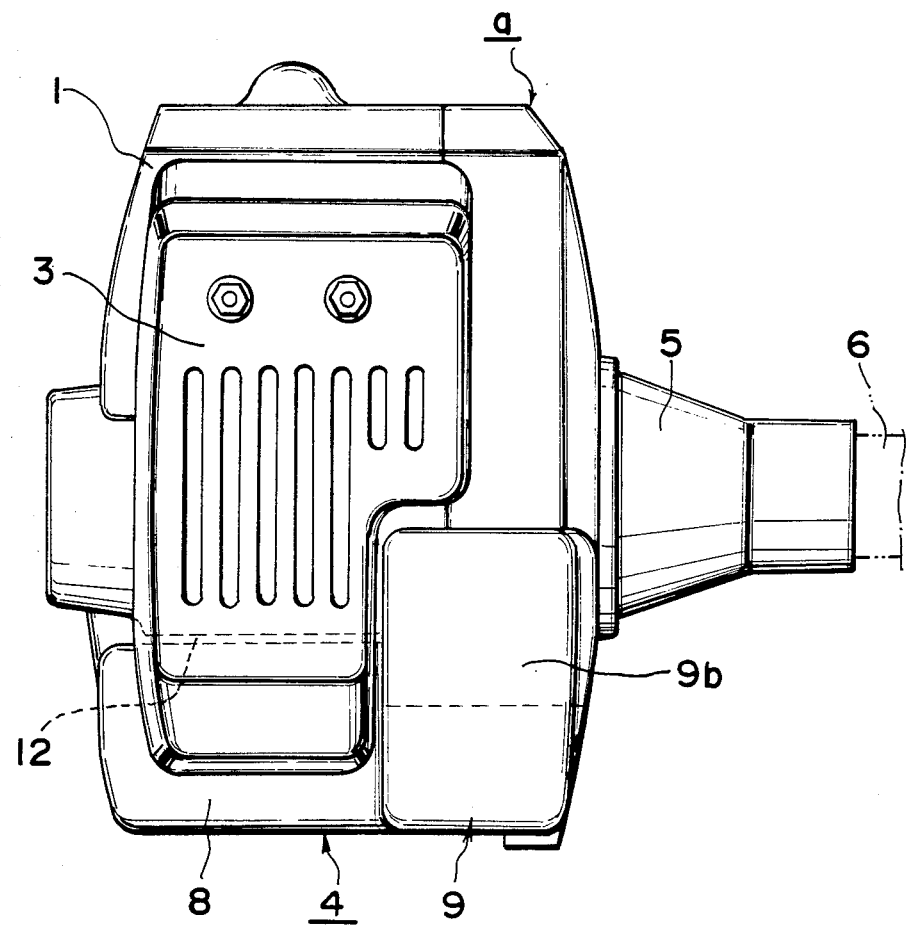
FIG. 3 is a left side view of FIG. 1.

In the present invention, as shown in FIGS. 1 to 3, the air cleaner 2 and the muffler 3 are formed to be vertically long respectively at the lower ends thereof as extended downward from the lower surface of the engine body 1.

Figure 4:
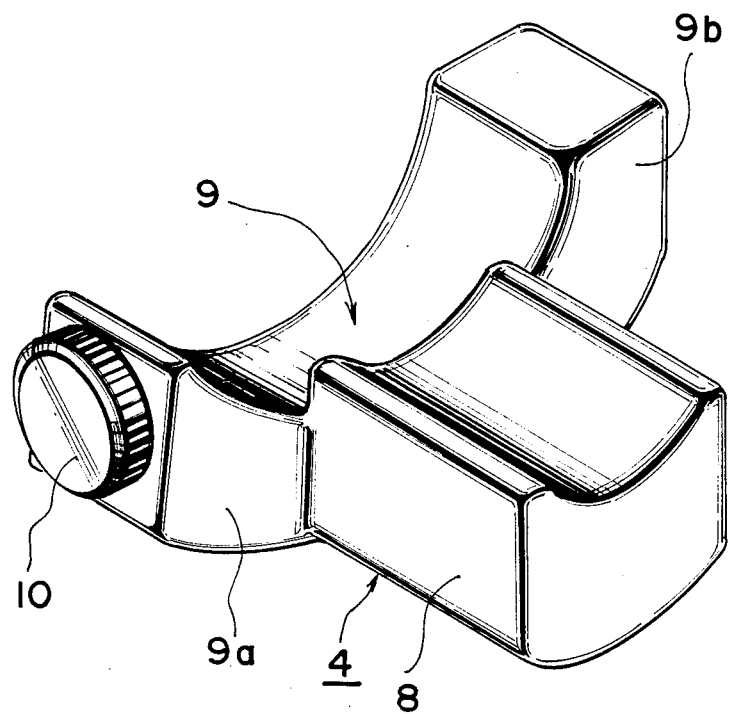
FIG. 4 is a perspective view of the fuel tank.

Also, as shown in FIG. 4, the fuel tank 4 is formed to be substantially like T made integrally of a barrel part 8 and a head part 9 inflated out on both sides in front of the barrel part 8. By the way, in the case of the illustrated embodiment, as the lower surface of the engine body 1, that is, the bottom surfaces of the fun case and the crankcase are formed to be arcuately curved surfaces, the barrel part 8 and the head part 9 are curved so as to be along the curved bottom surfaces of the engine body 1. Also, in the drawings, the reference numeral 10 represents a cap provided in a fuel feeding port of the fuel tank 4 and 11 represents an inserting through port for a fuel suction tube.

As shown in FIGS. 1 to 3, the barrel part 8 of the fuel tank 4 is fitted in a space 12 made by the lower parts of the air cleaner 2 and the muffler 3 below the engine body 1 and the fuel tank 4 is inflated out upward respectively on both sides 9a and 9b and is arranged in front of the lower parts of the air cleaner 2 and the muffler 3. By the way, though not shown in the drawings, the fuel tank 4 is fitted to the engine body 1 by means of proper fitting members or fixing bands.

According to the present invention of the above mentioned formation, as the air cleaner 2 and the muffler 3 are formed to be downward extended respectively at the lower ends thereof below the lower surface of the engine body 1, their volumes will be larger by the extensions than the volumes of the air cleaner and the muffler in the conventional engine. As a result, there are advantages that the noise can be reduced and the output can be improved. In the present invention, as described above, as the fuel tank 4 is formed to be substantially like T, there are advantages that the remaining space avoiding the downward extensions of the above mentioned air cleaner 2 and the muffler 3 can be effectively utilized as a space for the fuel tank 4 and the engine can be made compact and neat as a whole while securing the tank capacity.

By the way, of example, a pump-up feeding type is shown in the illustrated embodiment. However, the type may be inverted to be a gravity feeding type.

As described in detail in the above, according to the present invention, there can be obtained the effects that the output can be improved and the noise can be reduced while securing the capacity of the fuel tank and that the engine body can be made compact and neat.

What is claimed is:

1. An internal combustion engine provided with an air cleaner and a muffler respectively on opposite sides of the crankshaft of the engine body and with a fuel tank below them wherein said air cleaner and said muffler are arranged along the respective sides of said engine body, and each having a portion extending vertically below said engine body, said fuel tank being formed to be substantially in the shape of a T and is integrally formed of a barrel part and a head part extending laterally on opposite sides and in front of said barrel part, said barrel part being fit in the space between said air cleaner and said muffler below said engine body and said laterally extending opposite side parts of said head part are arranged respectively in front of the extending portions of said air cleaner and said muffler.

* * * * *